(12) United States Patent
Berger et al.

(10) Patent No.: US 7,322,698 B2
(45) Date of Patent: *Jan. 29, 2008

(54) METHOD FOR JUDGING CHANGES IN IMAGES OF THE EYE OR ITS COMPONENT PARTS

(75) Inventors: Jeffrey W. Berger, deceased, late of Cherry Hill, NJ (US); by Karen R. Berger, legal representative, Cherry Hill, NJ (US); Richard A. Stone, Havertown, PA (US)

(73) Assignee: The Trustees Of The University of Pennsylvania, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/432,230

(22) Filed: May 10, 2006

(65) Prior Publication Data

US 2006/0238706 A1 Oct. 26, 2006

Related U.S. Application Data

(63) Continuation of application No. 10/761,606, filed on Jan. 21, 2004, now Pat. No. 7,147,329, which is a continuation of application No. 10/168,932, filed on Dec. 18, 2002, now Pat. No. 6,698,885, which is a continuation of application No. PCT/US00/34797, filed on Dec. 21, 2000.

(60) Provisional application No. 60/171,519, filed on Dec. 22, 1999.

(51) Int. Cl.
*A61B 3/14* (2006.01)

(52) U.S. Cl. ........................ 351/206; 351/246; 351/205

(58) Field of Classification Search ................. 351/206
See application file for complete search history.

(56) References Cited

U.S. PATENT DOCUMENTS

| | | | |
|---|---|---|---|
| 3,711,712 A | 1/1973 | McLaren | 378/163 |
| 4,824,238 A | 4/1989 | Feldman et al. | 351/206 |
| 5,394,199 A | 2/1995 | Flower | 351/206 |
| 5,836,872 A | 11/1998 | Kenet et al. | 600/306 |
| 5,867,170 A | 2/1999 | Peterson | 345/592 |
| 6,084,598 A | 7/2000 | Chekerylla | 345/441 |

(Continued)

OTHER PUBLICATIONS

Algazi, R. V., et al., "Computer analysis of the optic cup in glaucoma," *Invest. Ophthalmol Vis. Science*, 1985, 26, 1759-1770.

(Continued)

*Primary Examiner*—Jessica T Stultz
(74) *Attorney, Agent, or Firm*—Woodcock Washburn LLP

(57) ABSTRACT

The invention includes a computer-implemented method, system, and computer-readable medium having computer-executable modules for judging changes in components of an eye. The inventive computer-implemented method includes the steps of acquiring, displaying, and superimposing at least two digital images of the components of the eye. The method further includes the step of processing at least one of the digital images such that the superimposed images may be compared, and the step of flickering among the superimposed digital images. The step of acquiring the images may include the step of converting a photographic representation of the components of the eye to the digital image. The step of processing may include registering, warping, and/or aligning the digital images.

23 Claims, 3 Drawing Sheets

U.S. PATENT DOCUMENTS

| | | | | |
|---|---|---|---|---|
| 6,104,828 | A | | 8/2000 | Shioiri ........................ 382/128 |
| 6,108,005 | A | * | 8/2000 | Starks et al. ................. 345/419 |
| 6,379,006 | B1 | | 4/2002 | Eikelboom et al. ......... 351/221 |
| 6,698,885 | B2 | * | 3/2004 | Berger, et al. .............. 351/206 |
| 7,147,329 | B2 | * | 12/2006 | Berger, et al. .............. 351/206 |

OTHER PUBLICATIONS

Berger, "Quantitative, image sequence analysis of fundus fluorescein angiography," *Ophthalmic Surgery & Lasers*, 1999, 30, 72-73.

Berger, J.W., et al., "Computerized stereochronoscopy and alternation flicker to detect optic nerve head contour change," *Ophthalmology*, 2000, 107, 1316-1320.

Goldmann, H., et al., "Rapid detection of changes in the optic disc: stereo-chronoscopy," Albrecht v. Graefes, *Arch. klin. exp. Ophthal.*, 1977, 202, 87-99.

Goldmann, H., et al., "Rapid detection of changes in the optic disc: stero-chronoscopy. II. Evaluation technique, influence of some physiologic factors, and follow-up of a case of choked disc.," Albrecht v. Graefes *Arch. Klin. Exp. Ophthal.*, 1978, 205, 263-277.

Heijl, A., et al., "Diagnosis of early glaucoma with flicker comparisons of serial disk photographs," *Invest. Ophthalmol and Vis. Science*, 1984, 30, 2376-2384.

Heijl, A., "Flicker analysis," *Clinical Methods, Chapter 14*, 169-183.

Nagin, P., et al., "Measurement of fluorescein angiograms of optic disk and retina using computerized image analysis," *Ophthalmology*, 1985, 92, 547-552.

Nagin, P., et al., "The reproducibility of computerized boundary analysis for measuring optic disc pallor in the normal optic disc," *Ophthalmology*, Feb. 1985, 92(2), 243-251.

Shin, et al., "Computer-assisted, interactive fundus image processing for macular drusen quantitation," 1999, Ophthalmology, 106, 1119-1125.

Varma, R., et al., "Diagnosis of early glaucoma with flicker comparisons of serial disc photographs," The Optic Nerve in Glaucoma, *Investigative Ophthalmology & Visual Science*, Nov. 1989, 30(11), 2376-2384.

* cited by examiner

METHOD FOR JUDGING CHANGES IN IMAGES OF THE EYE OR ITS COMPONENT PARTS

CROSS REFERENCE TO RELATED APPLICATIONS

This application is a continuation of U.S. patent application Ser. No. 10/761,606, which was filed on Jan. 21, 2004, now U.S. Pat. No. 7,147,329, which is a continuation of U.S. patent application Ser. No. 10/168,932 filed Dec. 18, 2002, now U.S. Pat. No. 6,698,885, which is a continuation of the U.S. National Phase of Application Ser. No. PCT/US00/34797, which was filed on Dec. 21, 2000, which claimed priority under 35 U.S.C. § 119 (e) to U.S. Provisional Patent Application Ser. No. 60/171,519, which was filed on Dec. 22, 1999, which all are hereby incorporated by reference in their entireties.

STATEMENT OF GOVERNMENT SUPPORT

This invention was supported by funds from the U.S. Government (NIH Grant No. NIH K08-00374). The U.S. Government may therefore have certain rights in the invention.

FIELD OF THE INVENTION

The invention relates to the field of diagnosis and management of eye diseases or conditions. More specifically, the invention relates to a method of judging changes in digital images of components parts of the eye to diagnose and manage eye diseases or conditions.

BACKGROUND OF THE INVENTION

Detecting certain diseases or conditions of the eye often requires comparing photographic representations of the eye's component parts. Typically, such photographs are taken over the course of years by different examiners using different devices. These inevitable variations often result in an unavailing comparison that frequently frustrates the diagnosis of blinding diseases, like glaucomatous optic neuropathy ("glaucoma").

Glaucoma is a blinding disease associated with progressive impairment of optic nerve function. Diagnosis and management of the patient with, or at risk for, glaucoma is highly dependent on detecting contour changes in the optic nerve head. Currently, detecting such contour changes in the clinical environment requires careful visual inspection of sequential, magnified, stereoscopic optic nerve head photographic image pairs that have been acquired at distinct instances in time. These image pairs may be acquired by a standard fundus camera, scanning laser ophthalmoscope, slitlamp camera, or other device capable of imaging the eye or its component parts.

With glaucoma, an examiner uses a stereoscopic viewer to view various images of the optic nerve head. Contour changes are observable as apparent differences in depth between the images. Discerning such changes through visual inspection, however, is difficult for patient management and clinical research trials. In particular, the examiner cannot superimpose the stereoscopic images, but must attempt to do so in his mind. This endeavor is made more difficult by the requisite time interval between captured images (often years), which invariably results in different magnification, rotation, position, and warp among the different captured images. As a result, detection of glaucoma using a stereoscopic viewer is notoriously difficult. Similarly, change detection based on images of the eye or its component parts is difficult whether derived from fundus photography, angiography, slitlamp photography, or other sources.

As a result of the difficulty in evaluating stereoscopic images of the optic nerve head, many clinicians compare visually only the information available on monocular photographs of the optic nerve head. In other words, they compare monocular photographic images of the optic nerve head taken over time, typically over the course of years, seeking to identify changes such as advancing atrophy or altered position of the retinal vessels. The unavoidable variations (e.g., exposure, orientation, and magnification) in photographs obtained over the course of years limit the diagnostic sensitivity of this manual approach to glaucoma diagnosis.

Goldmann and Lotmar, in extending a technique they termed "stereo-chronoscopy," proposed that pairing monocular sequentially obtained photographic images of the optic disc could improve glaucoma diagnosis and management. Goldmann H. and Lotmar W., *Rapid Detection of Changes in the Optic Disc: Stereo-chronoscopy*, Albrecht v. Graefes Arch. klin. exp. Ophthal. 202: 87-99 (1977); Goldmann H. and Lotmar W., *Rapid Detection of Changes in the Optic Disc: Stereo-chronoscopy. II. Evaluation Technique, Influence of Some Physiologic Factors, and Follow-Up of a Case of Choked Disc.*, Albrecht v. Graefes Arch. klin. exp. Ophthal. 205: 263-277 (1978). In this technique, monocular photographic views of the optic nerve head taken at different times were viewed simultaneously as a pseudo-stereo pair in a stereoscope. Optic disc change over time theoretically would appear as a pseudo-stereo effect in these paired images, while stable discs would appear flat to the observer. This method presupposed the capability of clinical photographic and optical methods to obtain images that could later be aligned visually. Because it proved impractical to take optic nerve photographs initially with the alignment precision demanded by the technique, stereo-chronoscopy never progressed beyond the initial pilot development stages.

A number of early studies attempted to improve on stereo-chronoscopy by employing various alternative means to achieve image superposition. For example, Heiji A. and Bengtsson B., *Diagnosis of Early Glaucoma with Flicker Comparisons of Serial Disk Photographs*, Invest. Ophthalmol and Vis. Science 30: 2376-2384 (1984) developed a crude form of flicker comparison by alternating between images from a projector device. This technique also allowed for manual alignment of the projectors to correct for translational and rotational misalignment between the sequential images. The methods of these authors were complex and time-consuming, but they did conclude that flicker analysis could be useful clinically.

Algazi R. V., Keltner J. L., and Johnson C. A, *Computer Analysis of the Optic Cup in Glaucoma*, Invest. Ophthalmol Vis. Science 26: 1759-1770 (1985) also described an early approach based on registration of sequentially acquired images with a reference image. The user could control rotation, translation and scale in order to bring these images into alignment. Sequential monocular display then facilitated change detection. The authors noted that the procedure was very time consuming when compared with standard techniques and that results were not reproducible.

Nagin P., Schwartz B., and Reynolds G., *Measurement of Fluorescein Angiograms of Optic Disk and Retina Using Computerized Image Analysis* 92: 547-552, Ophthalmology (1985) registered angiographic optic disc images to permit analysis of vascular filling in these image sequences. Vascular crossing points were identified automatically, and correspondence between these points allowed for determination of an average translational and rotational displacement vector describing the image transformation. However, this technique was not formally validated. Moreover, accurate fundus image change detection requires image registration beyond that permitted by rigid body transformations (i.e., rotation and translation).

Other methods have been developed that typically using complex optical instruments to obtain clinical images and provide quantitative measures of optic nerve head topography. However, because of their complexity, questionable accuracy, and uncertain diagnostic superiority, none of these newer methods has achieved widespread use or acceptance. Moreover, these complex methods often are unable to use archived photographic images of the patient's optic nerve head, which are important in detecting the progressive changes attributable to glaucoma. Thus, subjective assessment of standard clinical examination and standard fundus photographic images remains the primary method for diagnosing glaucoma.

SUMMARY OF THE INVENTION

In view of the above-mentioned limitations in the prior art, the invention describes a more practical method for detecting and analyzing images of the eye or its component parts. Although the prior art has developed from methods for glaucoma diagnosis and management, the invention has utility in diagnosis and treatment of other eye diseases as well.

The invention includes a computer-implemented method, system, and computer-readable medium having computer-executable modules for assisting in discernment of changes in components of an eye. The inventive computer-implemented method includes the steps of acquiring, displaying, and superimposing at least two digital images of the components of the eye. The method further includes the step of processing at least one of the digital images such that the superimposed images may be compared, and the step of flickering among the superimposed digital images. The step of acquiring the images may include the step of converting a photographic representation of the components of the eye into the digital image. The step of processing may include registering, warping, and/or aligning the digital images. The step of registering the digital images may include the step of non-rigid, non-global deforming of the digital images. The step of warping may include the step of global and/or non-global deforming of the digital images. The step of aligning includes the steps of non-rigidly and/or rigidly aligning of the digital images. The method may further include the step of detecting changes among the flickered, superimposed digital images, and diagnosing a condition of the eye as a function of the detected changes. The inventive method further may include the step of selecting at least two of the acquired images.

The invention also includes a system for judging changes in components of the eye. The inventive system includes a data processor that receives and superimposes the digital images of the components of the eye. The data processor also processes the digital images to facilitate comparison among the images. The system also includes a display device in communication with the data processor for displaying the digital images and the superimposed images, and a control unit in communication with the data processor for flickering among the superimposed images. The control unit may include a keyboard, a mouse, a joystick, and/or a microphone, for example. The digital images may be monoscopic images that depict an optic nerve head component of the eye. The system also may include an image scanner in communication with the data processor for converting photographic images of the components of the eye into the digital images. Also, the system may include a digital image acquisition device in communication with the data processor for acquiring the digital images. The digital image acquisition device may include a direct ophthalmoscope, slitlamp biomicroscope, and fundus camera, for example. In addition, the system may have a data store in communication with the data processor for storing the digital images.

The invention also includes a computer-readable medium having computer-executable modules. The computer-executable modules include an input module for receiving digital images of the components of the eye, a video module for superimposing the digital images and for displaying the superimposed digital images on a display, and a control module for flickering among the superimposed digital images. The input module may be adapted to receive the digital images from an image scanner, and to receive the digital images directly from a digital image acquisition device. The computer-readable medium may have an image processing module for processing at least one of the images, and a data storage module for storing the digital images.

BRIEF DESCRIPTION OF THE DRAWINGS

The foregoing and other novel features and advantages of the invention will become more apparent and more readily appreciated by those skilled in the art after consideration of the following description in conjunction with the associated drawings, of which.

DETAILED DESCRIPTION OF THE INVENTION

Figure 1:
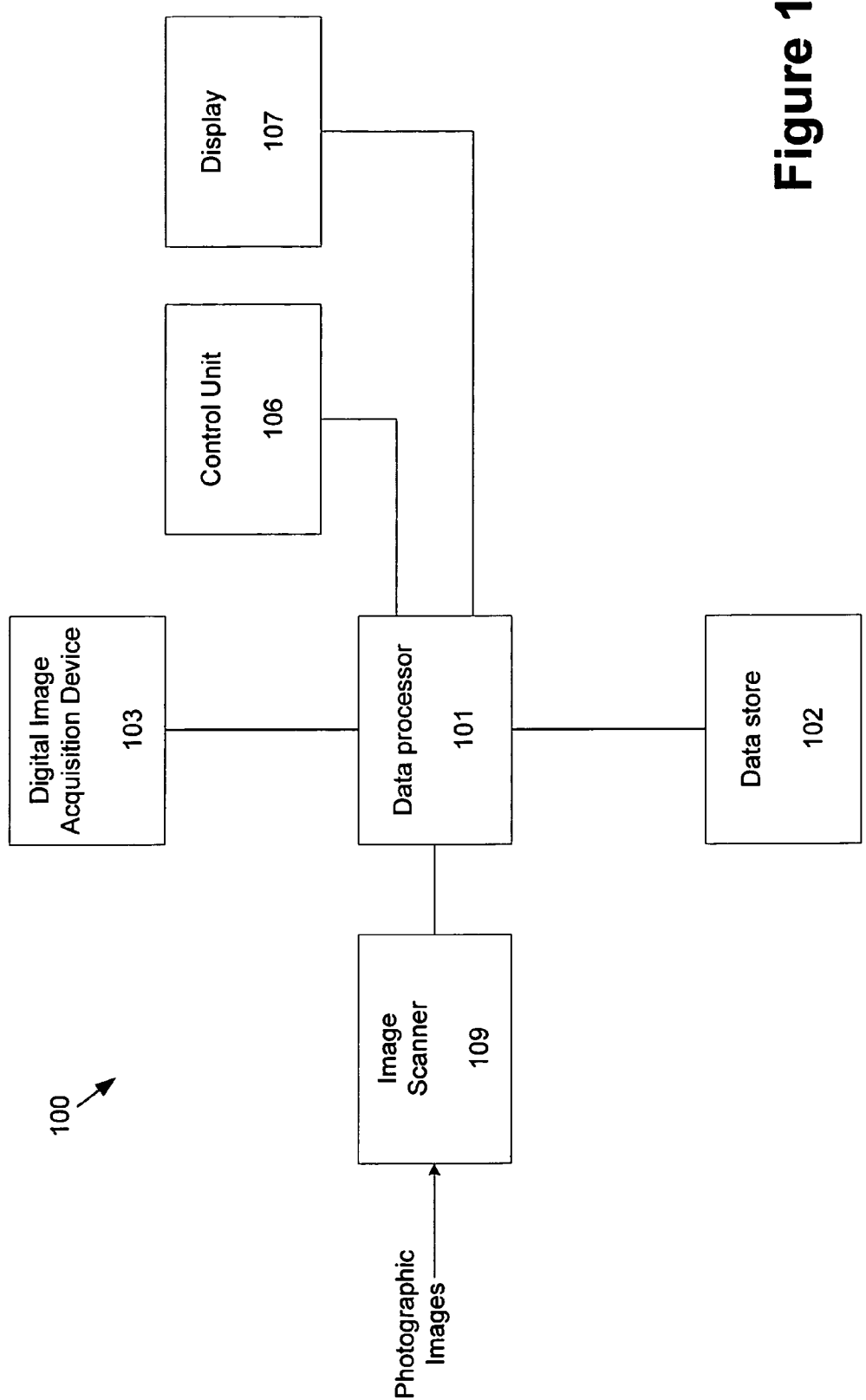
FIG. 1 is a block diagram of a system for judging changes in components of an eye, according to the invention.

FIG. 1 is block diagram of a system 100 for judging changes in components of an eye. As shown in FIG. 1, a data processor 101 is in communication with a digital image acquisition device 103. Data processor 101 may be a part of a typical computer-readable medium, like a desktop computer, for example. Data processor 101 may have modules and/or computer-executable instructions in the form of software capable of receiving and/or processing digital images of the component parts of the eye. Such processing is necessary to align images of the component parts of the eye taken over time, such that intelligent comparison may be made for the purposes of detecting and managing diseases of the eye, including glaucoma.

Digital image acquisition device 103 is a device capable of capturing images of the component parts of the eye in a digital format. Digital image acquisition device 103 acquires digital images of component parts of the eye, and provides the digital images to data processor 101. Digital image acquisition device 103 may be a single unit, for example model number NS-1V slitlamp biomicroscope available from Nikon, Inc., a similar slitlamp biomicroscope available from Topcon, Inc., or similar digital fundus camera. It should also be appreciated that digital image acquisition device 103 may be an analog image acquisition device coupled to a camera unit (not shown). In this case, the image acquisition device may be a direct ophthalmoscope, slitlamp biomicroscope, or fundus camera, for example. The direct ophthalmoscope may be a device commercially available from Welch-Allyn, Inc., and the slitlamp biomicroscope may be a device commercially available from Nikon, Inc., model number NS-1V. The fundus camera may be a FF4 fundus camera, available from Zeiss, Inc. The camera unit (not shown) may be adapted to receive images from the direct ophthalmoscope and the slitlamp biomicroscope, for example, a charge coupled device (CCD) camera.

Data processor 101 further is in communication with an image scanner 109. Image scanner 109 is a device capable of converting a photographic image into a corresponding digital image having a certain resolution and a certain file format. Image scanner 109 is useful in permitting archived non-digital images of the component parts of the eye to be used by the invention, for example 35 mm or Polaroid images. Image scanner 109 may be a Scanmaker 35t, available from Microtek, Inc., and capable of creating a digital image in any format and resolution, for example a Joint Photographic Experts Group (JPEG) digital image with a 1000 dots-per-inch (dpi) resolution. Digital processor 101 receives the digital image in the predefined file format (e.g., JPEG) from image scanner 109.

Data processor 101 further is in communication with a data store 102. Data store 102 may be a typical magnetic storage media capable of storing the digital images from digital image acquisition device 103 and/or image scanner 109. Data store 102 may be used to store the images of the component parts of the eye temporarily until the images are processed by data processor 101, or permanently for long-term use and diagnosis.

Data processor 101 further is in communication with a control unit 106 and a display 107. Control unit 106 is a device that permits a user to flicker the digital images, while they are displayed on display 107. Also, control unit 106 may be a device or computer-implemented program that automatically flickers among the images based on a rate defined by a user on control unit 106. Control unit 106 may be a keyboard, mouse, joystick, and/or microphone capable of communicating with data processor 101 in response to commands from a user. As a user manipulates control unit 106, data processor 101 receives and processes the commands from control unit 106. Data processor 101 then presents the images to be viewed on display 107, in accordance with the user's commands via control unit 106.

Figure 2A:
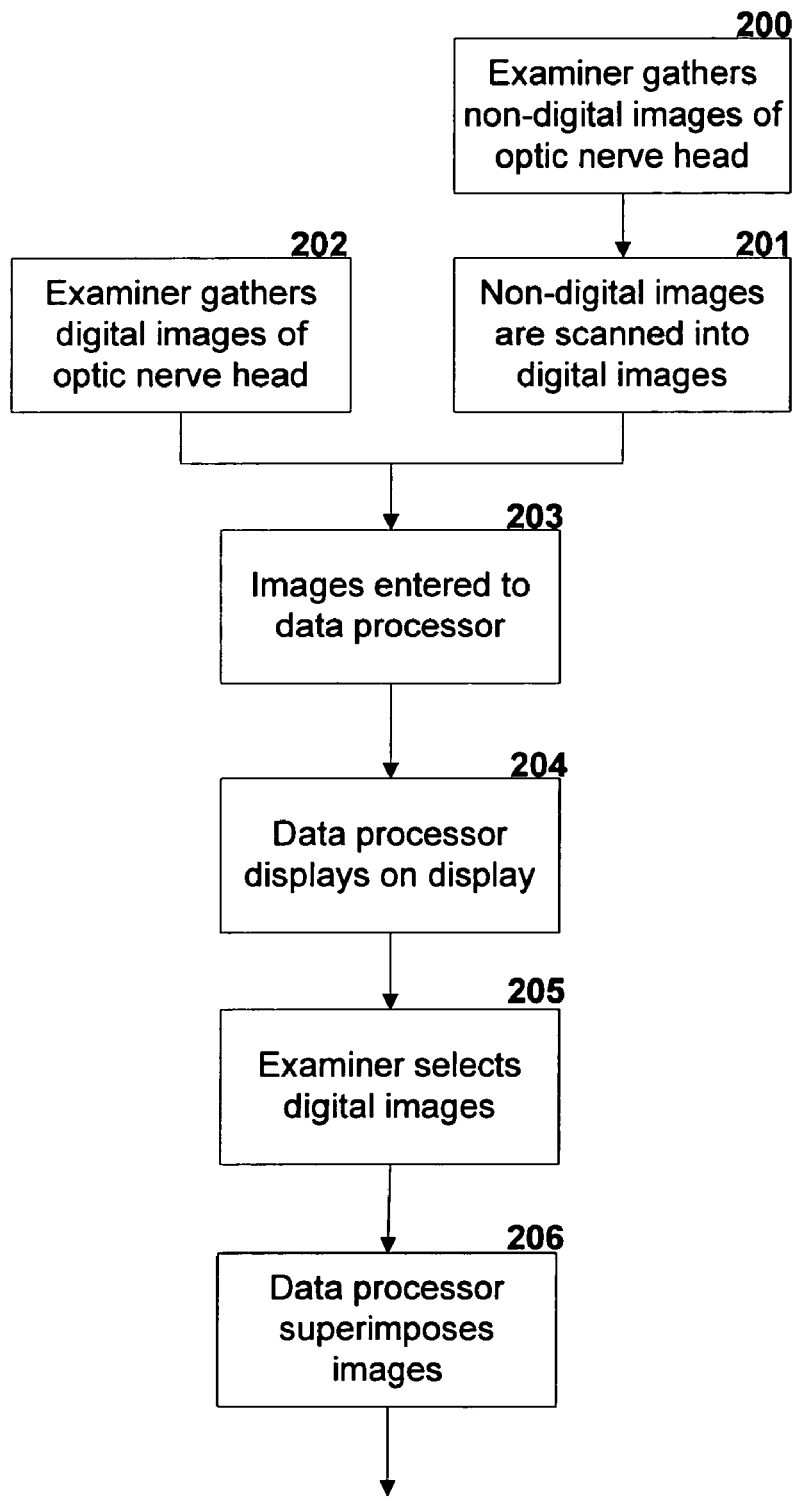
FIGS. 2A and 2B provide a flowchart of a method for judging changes in components of an eye, according to the invention.
Figure 2B:
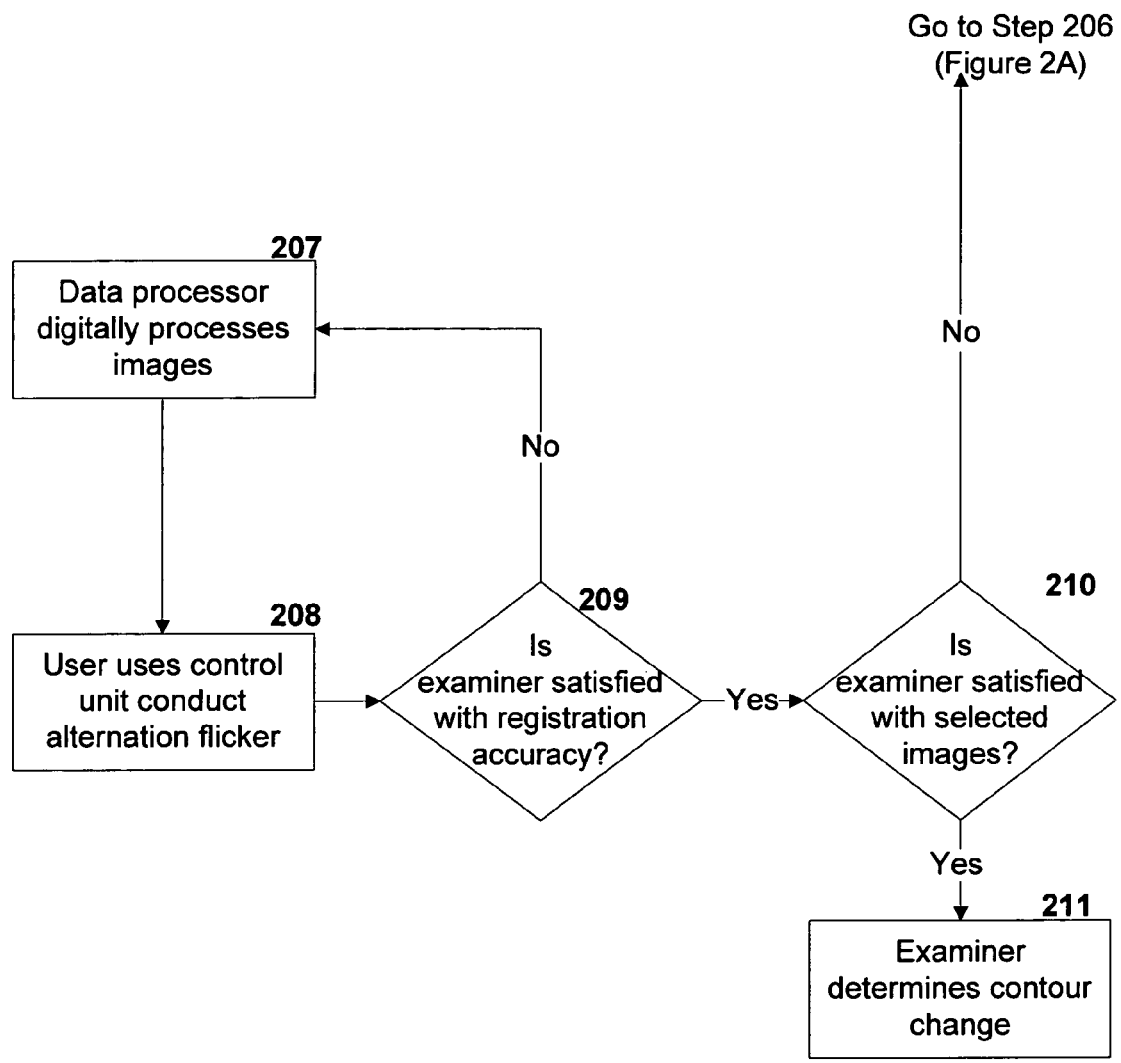

FIGS. 2A and 2B provide a flowchart of describing the operation of system 100 (as shown in FIG. 1) for judging changes in images of the optic nerve head. Although the method shown in FIGS. 2A and 2B is specific to changes in the optic nerve head for the purposes of detecting glaucoma, it should be appreciated that this method can be applied to judging changes in images of any component part of the eye for documentation, diagnosis and/or treatment of any disease or condition of the eye.

As shown in FIG. 2A, in step 200, an examiner gathers available non-digital images of a patient's optic nerve head. These images may be 35 mm photographic images and/or Polaroid images, for example. These non-digital images may be acquired using a fundus camera, a slitlamp, or any other device capable of capturing images of the optical nerve. The non-digital images may then be scanned in step 201 into a digital format using image scanner 109, for example. In step 202, the examiner gathers any available digital images of a patient's optic nerve head. These digital images may be acquired using digital image acquisition device 103, for example, a digital fundus camera, or any other device capable of acquiring digital images of the optic nerve. These digital images also may be previously captured and located on a digital storage medium, for example a floppy disk or hard-disk drive. In step 203, the converted images and the digital images are provided to data processor 101. The images may be entered to data processor 101 directly from image scanner 109 and/or from digital image acquisition device 103.

In step 204, data processor 101 acts to display the digital images on display 107. In step 204, the examiner selects two or more images from the displayed images to be processed and superimposed by data processor 101. The selected images may be based on the clarity of the images, and their similarity to the corresponding displayed images, or other desired characteristics. Data processor 101 superimposes the selected displayed images in step 206.

As shown in FIG. 2B, in step 207, the displayed images undergo digital image processing techniques, including polynomial warping, registering, and aligning to correct for differences in translation, rotation, magnification, and warping, for example. In particular, the image registration employs polynomial warping techniques that permit global and non-global deformation of the images. Image registration incorporating non-rigid, non-global deformations have not heretofore been applied for change detection successfully for eye images in general, or optic nerve head images, in particular. In this way, a first image can be warped into registration with a second image. The aligning may include non-rigid or rigid alignment techniques, or both. Such digital processing permits images that are incomparable in their original form to be compared accurately for discernment of stability or change for the purposes of documenting, diagnosing and/or managing eye diseases and conditions. These digital processing techniques have been defined in the following references, incorporated herein by reference: Berger, *Quantitative, image sequence analysis of fundus fluorescein angiography*, Ophthalmic Surgery & Lasers 1999; 30:72-73; Shin, Javornik, and Berger, *Computer-assisted, interactive fundus image processing for macular drusen quantitation*, Ophthalmology 1999; 106: 1119-1125, and Berger J W et al *Computerized stereochronoscopy and alternation flicker to detect optic nerve head contour change*, Ophthalmology 2000; 107: 1316-1320. It should be appreciated that the invention may include other types of processing necessary to permit intelligent, unambiguous comparison of the images.

In step 208, once the images are processed by data processor 101, the examiner uses control unit 106 to alternate back-and-forth among the images (i.e., "alternation flicker"). In this way, the examiner may selectively superimpose the images on top of each other, for example in chronological order in order to detect a progression of change in the image. This "alternation flicker" process facilitates detection of contour change (or no change) to the eye image or optic nerve by allowing the examiner to continuously compare various characteristics of the nerve including vessel position and orientation. In other words, such alternation flicker permits the selected images to be superimposed on top of each other, and thus facilitates the examiner's ability to detect changes among the images of the component parts of the eye.

In step 209, the examiner decides whether the registration accuracy of one or more of the images is satisfactory. If it is not satisfactory, the examiner may return to step 207 to perform additional image processing on the individual images. Once satisfied with the registration accuracy, the examiner determines whether another available image will improve the accuracy of the diagnosis in step 209. If the examiner determines that another image should be selected, the examiner returns to step 206 (as shown in FIG. 1) to select other images. If on the other hand, the examiner is satisfied with the selected images and their registration accuracy, in step 210, the examiner decides whether there is a contour change in the patient's optic nerve head, at step 211. The presence of change or no change in optic nerve head contour is crucial for diagnosis and management of glaucoma, and is vital for documentation, diagnosis and/or management of other eye diseases based on changes detected in images of the eye or its components.

Those skilled in the art will appreciate that numerous changes and modifications may be made to the preferred embodiment of the invention and that such changes and modifications may be made without departing from the spirit of the invention. For example, it should be understood that the invention may facilitate the detection of any changes in images of any component of the eye. It should also be understood that FIGS. 2A and 2B demonstrate just one of the many possible components of the eye that may be adjudged by the invention. Moreover, it should be appreciated that the invention is not limited to any components described herein. It is therefore intended that the appended claims cover all such equivalent variations as fall within the true spirit and scope of the invention.

What is claimed is:

1. A system for judging changes in components of an eye, comprising:
   a data processor that receives a pair of stereo photographic images of components of the eye, and that processes at least one of the pair of stereo photographic images to facilitate comparison among the images, said processing including at least one of (1) non-rigid, non-global deforming of the stereo photographic images, (2) global deforming of the stereo photographic images, and (3) non-global deforming of the stereo photographic images;
   a display device in communication with the data processor, wherein the display device displays the stereo photographic images; and
   a control unit in communication with the data processor, wherein the control unit compares the pair of stereo photographic images for detection of a change in components of the eye.

2. The system of claim 1, wherein the control unit matches the respective photographic images of the pair of stereo photographic images of the components of the eye and uses the matched pairs for detection of a change in components of the eye.

3. A computer-implemented method of judging changes in components of an eye, comprising:
   acquiring at least two different digital images of components of the eye;
   superimposing the digital images on a generated display;
   processing at least one of the digital images, said processing including at least one of (1) non-rigid, non-global deforming of the digital images, (2) global deforming of the digital images, and (3) non-global deforming of the digital images; and
   comparing the superimposed digital images as a function of the processing for detection of a change in components of the eye.

4. The computer-implemented method of claim 3, wherein the processing comprises registering the digital images.

5. The computer-implemented method of claim 4, wherein the registering of the digital images comprises non-rigid, non-global deforming of the digital images.

6. The computer-implemented method of claim 3, wherein the processing comprises warping the digital images.

7. The computer-implemented method of claim 6, wherein the warping comprises at least one of the following: global and non-global deforming of the digital images.

8. The computer-implemented method of claim 3, wherein the processing comprises aligning the digital images.

9. The computer-implemented method of claim 8, wherein the aligning comprises non-rigidly aligning the digital images.

10. The computer-implemented method of claim 9, wherein the aligning comprises rigidly aligning the digital images.

11. The computer-implemented method of claim 3, further comprising detecting changes among the superimposed digital images.

12. The computer-implemented method of claim 3, further comprising at least one of the following: diagnosing, documenting, and managing a condition of the eye as a function of the detected changes in components of the eye.

13. The computer-implemented method of claim 3, wherein the acquiring of the digital images comprises converting a photographic representation of the components of the eye to the digital image.

14. The computer-implemented method of claim 3, further comprising selecting at least two of the acquired digital images.

15. The computer-implemented method of claim 3, further comprising flickering among the superimposed digital images.

16. A system for judging changes in components of an eye, comprising:
   a data processor that receives and superimposes at least two different digital images of components of the eye, and that processes at least one of the digital images to facilitate comparison among the images, said processing including at least one of (1) non-rigid, non-global deforming of the digital images, (2) global deforming of the digital images, and (3) non-global deforming of the digital images;
   a display device in communication with the data processor, wherein the display device displays the digital images and the superimposed digital images; and
   a control unit in communication with the data processor, wherein the control unit compares the superimposed digital images as a function of the processing.

17. The system of claim 16, further comprising an image scanner in communication with the data processor for converting photographic images of the components of the eye to the digital images.

18. The system of claim 16, wherein the control unit allows for flickering among the superimposed digital images.

19. The system of claim 16, further comprising a digital image acquisition device in communication with the data processor for acquiring the digital images.

20. The system of claim 16, further comprising a data store in communication with the data processor for storing the digital images.

21. The system of claim 16, wherein the digital image acquisition device comprises at least one of the following: a direct ophthalmoscope, an indirect ophthalmoscope, a slit lamp biomicroscope, and a fundus camera.

22. The system of claim 16, wherein the digital images depict an optic nerve head component of the eye.

23. The system of claim 16, wherein the digital images are monoscopic.

* * * * *